INVENTORS
Jack W. Kuehn
Harold W. Atkins
BY
Their Attorney

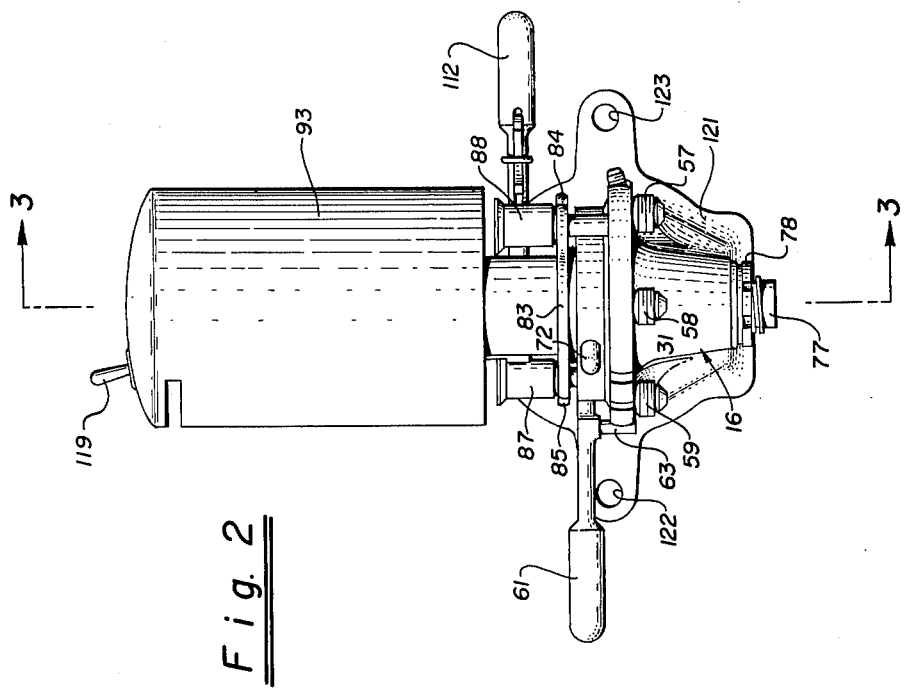

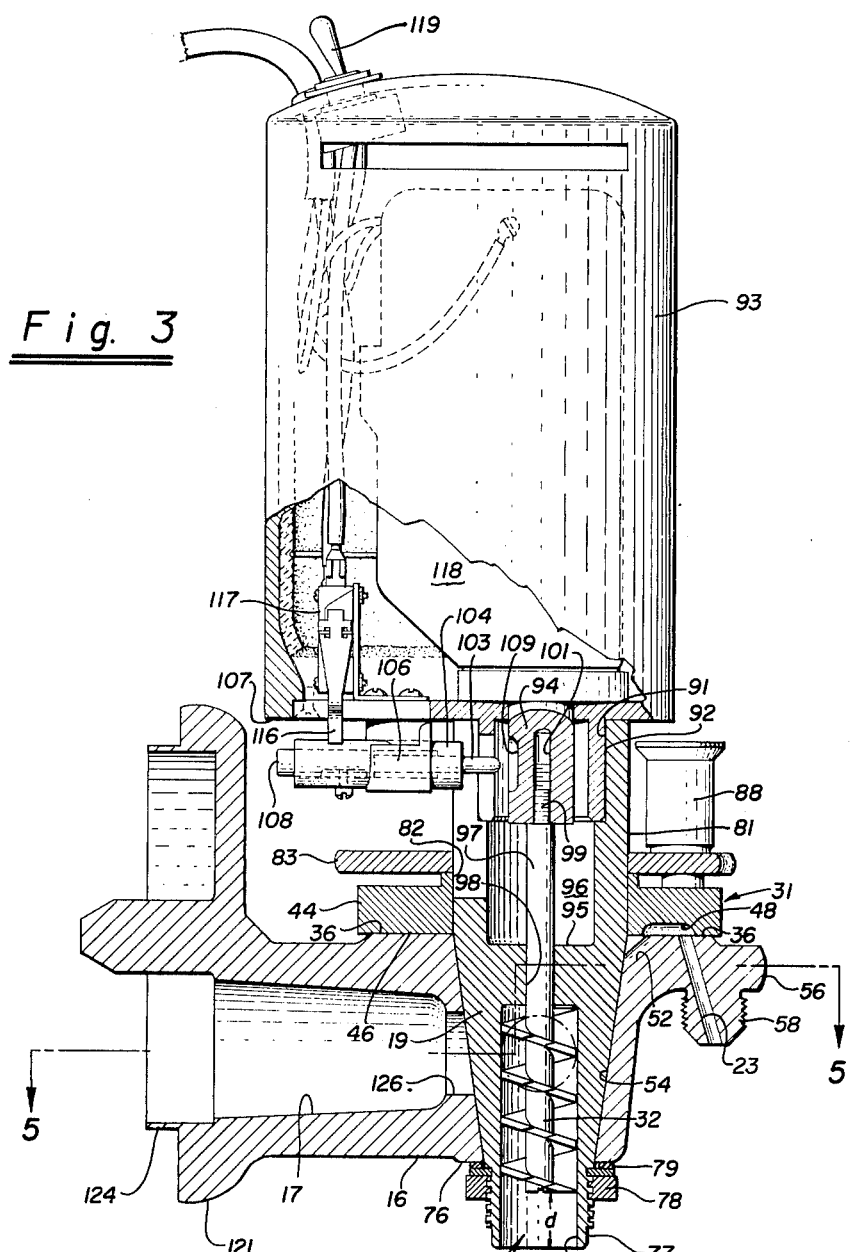

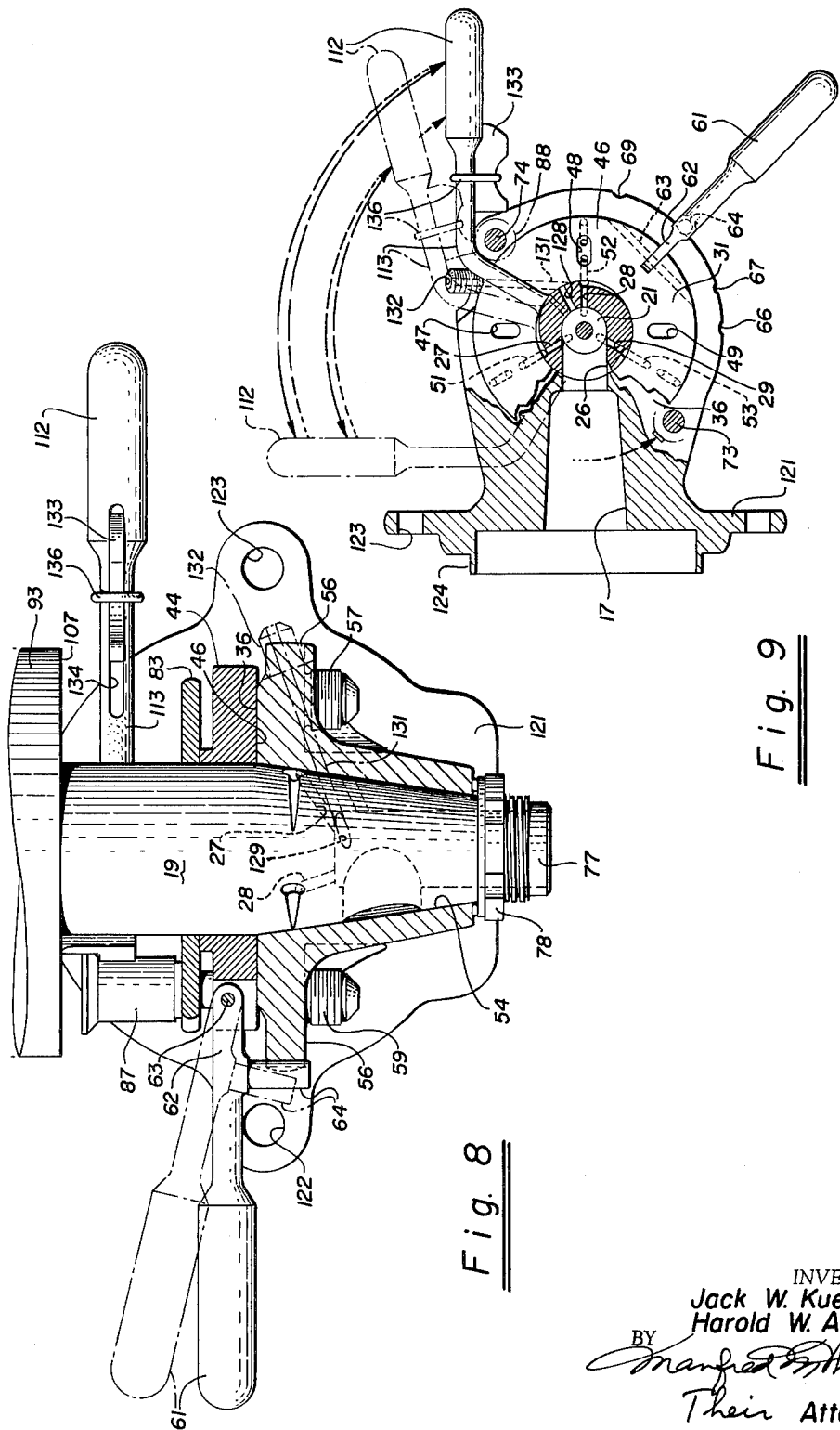

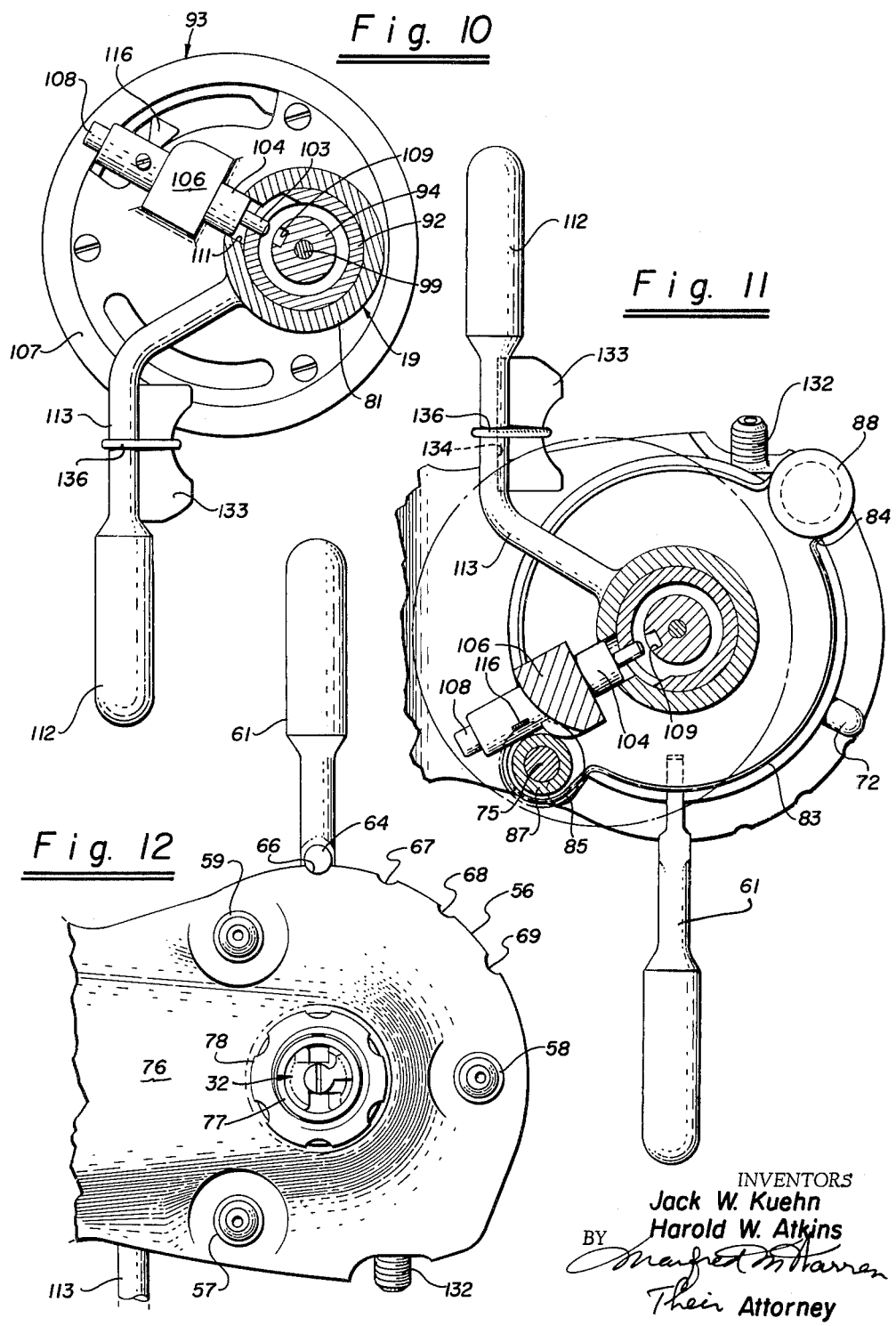

INVENTORS
Jack W. Kuehn
Harold W. Atkins
BY
Their Attorney

United States Patent Office 3,224,740
Patented Dec. 21, 1965

3,224,740
FLAVOR MIXING AND DISPENSING
DEVICE AND METHOD
Jack W. Kuehn and Harold W. Atkins, Minneapolis,
Minn., assignors to Dari-Go-Round, Inc., a corporation
of Minnesota
Filed Dec. 8, 1961, Ser. No. 157,984
18 Claims. (Cl. 259—8)

The invention relates to continuous style ice cream freezers and dispensers and more particularly to flavor mixing valves used therewith of the type disclosed in Atkins, Patent 2,736,534.

An object of the present invention is to provide a flavor mixing and dispensing device of the character described which will afford an instant selection of a variety of flavors for dispensing from a single freezer furnishing a standard vanilla base ice cream, and delivering the desired confection mixed to a solid color or flavor in either the conventional cone or a new milkshake form; and possessing the ability to alternately deliver end products of different flavor without significant flavor carry over from one product to another.

Another object of the present invention is to provide a flavor mixing and dispensing device of the character described which will dispense a flavor mixed product from a basic vanilla ice cream confection without disturbing or significantly affecting the pre-selected over-run of the basic confection.

A further object of the present invention is to provide a new and improved method of instantly producing and serving a milkshake confection of preferred texture and taste.

Still another object of the present invention is to provide a flavor mixing and dispensing device of the character above which is adaptable for use on existing makes of continuous style ice cream freezers and for easy and rapid attachment thereto; and which may with equal facility be removed therefrom for washing and maintaining in a clean and sanitized condition; the device being specially designed for the handling of food products and being of sturdy construction involving a minimum number of moving parts capable of giving the device a long and useful life.

The invention possesses other objects and features of advantage, some of which with the foregoing will be set forth in the following description of the preferred form of the invention which is illustrated in the drawings accompanying and forming part of this specification. It is to be understood however, that variations in the showing made by the said drawings and description may be adopted within the scope of the invention as set forth in the claims.

Referring to said drawings (six sheets):

FIGURE 1 is a side elevation of a flavor mixing and dispensing device constructed in accordance with the present invention.

FIGURE 2 is a front elevation of the device.

FIGURE 3 is a cross-sectional view on an enlarged scale, taken substantially on the plane of line 3—3 of FIGURE 2.

FIGURE 4 is a front elevation of a key used in dismantling the device.

FIGURE 8 is a cross-sectional view on an enlarged scale, taken substantially on the plane of line 8—8 of FIGURE 1.

FIGURE 9 is a composite cross-sectional view similar to FIGURE 5 with the sectioning taken in planes following the passages, and with cross-hatching partially deleted and certain of the parts removed and added in order to evolve a clear showing of inter-related operation of the parts.

FIGURE 10 is a cross-sectional view on an enlarged scale, taken substantially on the plane of line 10—10 of FIGURE 1.

FIGURE 11 is a cross-sectional view on an enlarged scale taken substantially on the plane of line 11—11 of FIGURE 1.

FIGURE 12 is a fragmentary bottom elevation of the device taken as suggested by the line 12—12 of FIGURE 1.

Figures 5, 6, 7:
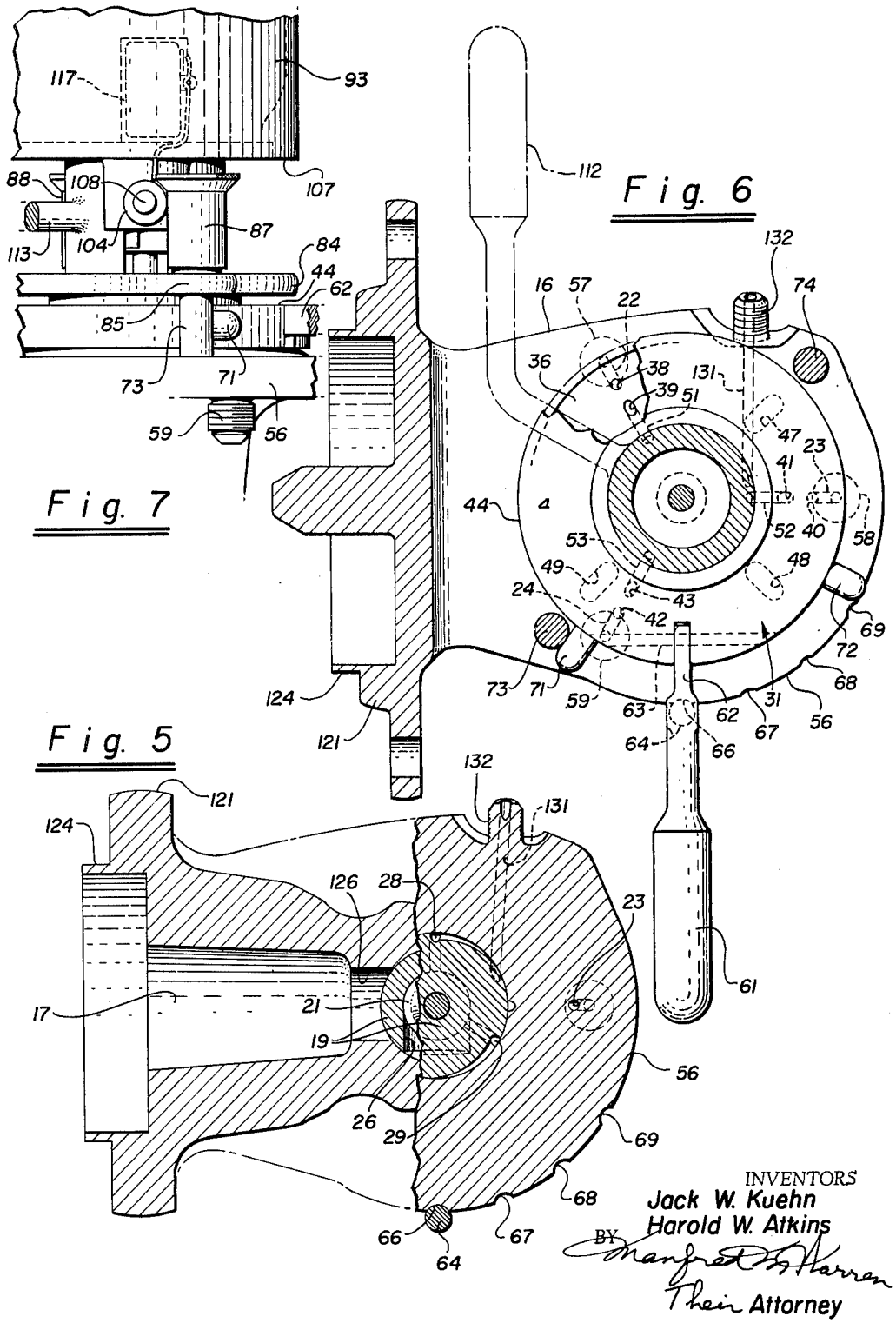
FIGURE 5 is a cross-sectional view taken substantially on the plane of line 5—5 of FIGURE 3.
FIGURE 6 is a cross-sectional view on an enlarged scale, taken substantially on the plane of line 6—6 of FIGURE 1.
FIGURE 7 is a fragmentary side elevation of a portion of the device.

The flavor mixing and dispensing device of the present invention consists briefly of a valve housing 16 having an inlet passage 17 adapted for connection to the discharge of a continuous style soft ice cream freezer 18; a valve member 19 mounted in the housing and having an open ended product mixing and discharge chamber 21; the housing being formed with a plurality of passages 22, 23 and 24, see FIGURE 6, each adapted for connection to a source of concentrated fluid flavor material under pressure and extending to valve 19 with each passage arranged to deliver individual flavoring material to the mixing chamber 21; valve member 19 having passages 26, 27, 28 and 29 arranged for simultaneous connection of chamber 21 to the ice cream passage 17 and all of the flavor material passages 22–24 in one position of the valve member, see FIGURE 9; valve means 31 mounted in the flavor material passages 22–24 and arranged for selective one at a time opening thereof so as to permit flow of flavoring material to chamber 21; and a power driven device 32 mounted in chamber 21 for mixing the products therein and effecting discharge of mixed products therefrom.

Ice cream freezers of the type with which the present device may be used are produced and marketed by the various manufacturers including Taylor Freezer, manufactured by Tekni-Craft, Rockton, Illinois; General Equipment Mfg. and Sales, Inc., of Indianapolis, Indiana; Harlee Mfg. Co., of Chicago, Illinois; Sweden Freezer Manufacturing Co., Seattle, Washington; H. E. Duke and Son, Inc., E. Moline, Illinois; and others. These freezers are generally known as the continuous type or style of ice cream freezers and dispense a frozen confection sometimes referred to as soft ice cream or soft serve, the material being variously produced from ice cream and ice milk bases. The well known consistency of soft ice cream or soft serve is a function largely of butter-fat content and temperature, the former running from about 2 to 12 percent and the latter from about 16° F. to 24° F. Preferably also the product has an overrun of about 30 to 50 percent. The product above described will be referred to generally in this application as a basic ice cream confection or as soft ice cream. Normally it is dispensed from a continuous style freezer in a single basic vanilla flavor although separate freezers may be set up in a single establishment for dispensing soft ice cream of other flavors. There has also been developed in this art a continuous style milkshake freezer which is of essentially similar construction but turns out a more fluid product. This may be accomplished by some change in the formula but mainly in a raising of the output temperature to a minimum of about 27° F. to 28° F. The continuous freezer type soft serve milkshake has a very smooth homogeneous consistency of the same character as the basic soft ice cream but differs therefrom primarily in being more distinctly a pourable liquid as contrasted to a stable plastic soft solid. Again, in the case of the continuous style milkshake freezer only one basic milkshake flavor is dispensed, usually vanilla, and separate freezers must be set up for dispensing milkshakes of other flavors. The flavor mixing and dispensing device of the present invention may be used with either continuous style freezer, soft serve or milkshake; and the term basic ice cream confection as used herein is intended to embrace both soft ice cream and milkshakes of the type produced by the continuous style freezer as above described.

The valve means 31 includes in part the provision by the valve housing 16 of an annular planar valve surface 36 concentric to valve member 19 and to which surface the several flavor passages 22, 23 and 24 are brought in a plurality of circumferentially spaced pairs of adjacent ports, see ports 38 and 39 for passage 22, ports 40 and 41 for passage 23, and ports 42 and 43 for passage 24. A flat valve selector plate 44 is provided with a flat underside 46 which is slidably mounted on surface 36 for normally blocking passage between the adjacent ports 38–43, but being formed with recesses 47, 48 and 49 which are dimensioned and shaped for spanning the adjacent ports for opening the flavor lines to the valve member 19.

By way of further explanation, there are two openings or ports 38–43 in the top surface 36 for each flavor line. In the present construction any of three such flavor lines may be selected and accordingly these pairs of ports may be arranged on radii located circumferentially at 120° from each other, see FIGURE 6. The inner port of each of the pairs is connected by an individual passage to the valve chamber wall 54 for valve member 19, see passage 51 for port 39, passage 52 for port 41, and passage 53 for port 43. The inner ends of passages 51–53 terminate in ports on wall 54 in circumferentially spaced position as seen in FIGURE 9 for simultaneous connection to the valve passages 27, 28 and 29 above described so that when the main ice cream port 26 is open, all three flavor ports will be wide open into the main chamber 21. However, only one of these flavor passages will be activated determined upon the position of the selector plate 44. Accordingly, in the present construction, there are two selections, one a pre-selection of the flavor by rotating the flavor selecting plate to open one of the fluid lines, and the other the rotation of valve member 19 to position admitting simultaneously into chamber 21 soft ice cream and the flavor material selected. As will be observed from FIGURE 6, selector valve plate 44 may be positioned in any of four positions. In the position illustrated in FIGURE 6 the plate is rotated to remove all of the recesses 47–49 from all of the adjacent pairs of ports 38–43 so that no flavor material will flow to the mixing chamber 21 and in this position of the selector plate, only the basic ice cream confection will be dispensed upon rotation of valve member 19 to register valve port 26 with inlet passage 17. The arrangement of recesses 47, 48 and 49 is such that a counter clockwise rotary displacement of valve member 44 approximately 20° will bring recess 49 into registration with ports 42 and 43 so as to activate flavor line 24, and it will be noted in this position recesses 48 and 47 remain out of registration with their respective associated ports 40 and 41 and 38 and 39. Another 20° counter clockwise rotation will bring recess 48 into registration with ports 40 and 41 thereby activating flavor line 23, while removing recess 49 from ports 42 and 43 thereby closing flavor line 24, it being further noted in this position that recess 47 is still spaced circumferentially from ports 38 and 39. A final 20° counter clockwise rotation of plate 44 will bring recess 47 into registration with ports 38 and 39 thereby activating flavor line 22 while closing off the other two sets of flavor ports. Since each of the flavor lines is carried directly to the valve member 19 it will be understood that there is a minimum of carry over of flavor material in changing from one flavor to another. It will also be clear that any number of flavors may be used with the use of an appropriate number and arrangement of ports.

In the present construction the valve planar surface 36 is formed at the upper side of a flange section 56 of the housing 16 and the several flavor material passages 22–24 may be conveniently formed in this flange section extending from surface 36 to threaded nipples 57, 58 and 59 extending from the underside of the flange section 56, see FIGURES 3, 6, 8 and 12. Nipples 57, 58 and 59 are adapted for connection to conduits, not shown, connected to portions of fluid flavoring material under pressure sufficient to cause the flow of such flavor material through the passages above described when connected for such flow. A variety of flavoring materials may be used such as strawberry, chocolate, black raspberry, etc.

Means is provided for conveniently rotating the selector plate to and indexing it in its various positions above described. As here shown a handle 61 is pivotally secured at its inner end 62 by a cross pin 63 for raising and lowering of a detent pin 64 of the underside of lever handle 61, see FIGURE 8, into and out of engagement with any one of a series of detent notches 66, 67, 68 and 69 arranged at 20° angle separation at the periphery of the flange section 56, corresponding with the four positions of the selector valve plate member 44 as above explained. When the operator swings the handle to the position illustrated in FIGURE 6, for example, that is with detent pin 64 engaged in the first detent notch 66, the apparatus will be set for dispensing the basic vanilla product without added flavoring material. The operator may engage and raise handle 61 as depicted in FIGURE 8 and swing the plate 20° in a counter clockwise direction as viewed in FIGURE 6 thus bringing valve recess 49 into registration with valve ports 42 and 43 and opening flavor line 24 connected to nipple 59. The dropping of detent pin 64 into detent notch 67 informs the operator that the valve is properly indexed for admitting flavoring material connected to nipple 59. Similar easy and rapid changing of the valve positioning may be accomplished by manually raising and rotating lever handle 61 for positioning of pin 64 in detent notches 68 and 69 for activating the flavor lines connected to nipples 58 and 57, respectively. Preferably also there is provided on the selector plate valve 44 a pair of radially extending stop pins 71 and 72 which are brought into abutting position with a pair of studs 73 and 74 in the first and last valve positions above explained thereby confining the rotary displacement of the dial plate to the four positions noted, see FIGURE 6.

As will be best seen in FIGURE 3, the valve chamber wall 54 is of frusto-conical form having its larger end opening upwardly to the flat valve surface 36 and the smaller end opening downwardly to the underside 76 of the housing. Valve member 19 is accordingly here of complementary frusto-conical shape so as to fit snugly upon wall 54 and is provided with a lower end portion 77 which projects beyond the lower end 76 of the housing. If desired, and as here shown, a nut 78 may be threaded onto the lower end portion 77 of the valve member for compressive engagement against a gasket 79 interposed between the nut 78 and the underside 76 of the housing for applying an axially seating force on the valve member. The application of some axial seating forces is desirable when the device is applied to freezers having a relatively high discharge pressure.

Valve member 19 is here provided with a generally cylindrical portion 81 projecting upwardly from the valve face 36 and which provides a bearing surface for journalling the valve ring plate 44, the latter here being formed with an inside surface 82 dimensioned for slidable mounting upon the outside diameter of the cylindrical portion 81. A holddown plate 83 is superimposed on the valve plate 44 and is here formed with a central opening for receiving the cylindrical portion 81 of the valve member therethrough and with a pair of diametrically opposed ears 84 and 85 formed with openings threaded upon studs 73 and 74. A pair of nuts 87 and 88 are here threaded on the upper ends of studs 73 and 74 and bear downwardly upon plate 83 to in turn hold the valve plate 44 in desired compression against the valve surface 36.

The upper end of the valve member 19 is here formed with an axially positioned socket 91 dimensioned to receive stub-shaped boss 92 formed on one end of an electric motor housing 93 to provide a vertical mounting for the latter with an adapter 94 on the motor driven shaft extending centrally of the boss 92 and into an upper central chamber 96 provided in the valve member 19 above a transverse wall or solid section 95 which separates chambers 96 and 21. The auger device 32 is here provided with a central shaft 97 which extends through an opening 98 formed in the solid section 95 and has a threaded end portion 99 threaded into a threaded end bore 101 provided in the shaft end adapter 94. The auger 32 may be conveniently assembled by extending shaft 97 up through the opening 98 and into threaded engagement with the motor shaft bore 101. This operation is facilitated by holding the motor shaft 94 against rotation and by the use of a key 102, as illustrated in FIGURE 4, which may be inserted through the open bottom end of chamber 21 for engagement with and for turning of the auger. Convenient holding of the motor shaft 94 against rotation is here effected by a transverse pin 103 here mounted for horizontal reciprocation in a housing 104, secured by bracket 106 to the underside 107 of the motor housing 93, the outer end 108 of the pin being manually engageable for lateral displacement of the pin into a recess 109 provided on the periphery of the motor shaft 94 for receipt of and keying with pin 103, see FIGURES 3, 10 and 11.

In the present construction, the motor housing 93 and valve member 19 rotate as a unit, it being noted that with reference to FIGURES 10 and 11 that the pin housing 104, anchored by bracket 106 to the motor housing, extends through a slot 111 provided in the upper end portion 81 of the valve member and substantially fills this slot transversely so as to key the motor housing and valve member for joint rotation. A handle 112 has an inner shank portion 113 fastened to the upper valve portion 81, see FIGURES 10 and 11, and projects laterally therefrom at an elevation between the hold-down plate 83 and the under side 107 of the motor housing 93, see FIGURES 2 and 8, for convenient manual engagement for rotating the valve member 19 between its several pertinent positions as illustrated in FIGURE 9. In the shutoff position of the valve as illustrated in phantom line in FIGURE 9, the handle 112 is swung counter clockwise until the pin housing 104 moves into abutment with nut 87, see FIGURE 7. In this "off" position of the valve, a switch arm 116 extending from the underside 107 of the motor housing is also brought into engagement with nut 85 so as to close an electric switch 117 mounted in the motor housing, see FIGURES 3 and 7. Preferably this electric switch 117 is biased to open position so as to automatically start the operation of the electric motor 118 mounted within the housing 93 when the valve is started in its movement from "off" to an ice cream delivering position. A manually engageable master control switch is conveniently mounted at the top of the motor housing for controlling the electric current flow to switch 117 and motor 118.

As an important feature of the present construction, the valve housing 16 is here formed integrally with a combination mounting plate and freezer door face plate 121 which will substitute for the conventional freezer door plate mounted as a header plate across one end of the freezer chamber. The size and arrangement of the freezer door face plate for different types of freezers will vary and the combination mounting and face plate 121 of the present unit is customized for each make of freezer. Usually the freezer cabinets are provided with two or more mounting studs (not shown) for securing in place the freezer door face plate, and in the present construction plate 121 is formed with mounting openings 122 and 123 for mounting on such studs. Also, as here shown, the face plate may be formed with a circular skirt 124 which is formed to snugly fit into the inside diameter of a cylindrical freezing chamber in the freezer to which the device is applied. According to the foregoing and as will be best seen in FIGURES 3, 5, and 9, passage 17 is formed in a laterally extending portion of the housing so as to open at one end through the mounting plate 121 within the skirt 124 and opening at its opposite end in a circular port 126 at the valve wall 54. By reason of this integral construction it will be understood that the device affords a unitary refrigerated unit including the mixing and product discharge chamber 21 and mixing auger therein, the flavor mixing and dispensing device of the present invention forming in effect a continuation in part of the freezer to which it is applied. Consequently, all mixing and dispensing operations are carried out under reduced temperature conditions. This construction not only maintains a desired quality in the end product dispensed, but also cooperates in the production of a novel and meritorious milkshake next discussed.

In the present device a milkshake is produced by effecting a simultaneous flow of streams of frozen confection from the soft ice cream or milkshake freezer and fluid milk into the chilled or refrigerated mixing chamber 21 and mixing the ingredients therein by the auger 32 and discharging the mixed product therefrom under continuous flow conditions. Fluid milk is introduced into chamber 21 by way of a radial passage 128, see FIGURE 9, formed in valve member 19 and which extends to a port 129 on the outside of the valve member which may be moved on appropriate rotation of the valve member into registration with a passage 131 formed in the housing and ported to the valve chamber wall 54, see also FIGURE 8. Passage 131 leads out to a nipple 132 on the flange section 56 threaded for connection to a suitable conduit (not shown) connected to a source of fluid milk product which may be whole milk, skim milk or fluid compounded with milk solids. Entry of milk into the mixing chamber 21 is effected by a full clockwise displacement of handle 112, see FIGURE 9, bringing the handle shank 113 into abutment with nut 88 on stud 74. In such position, as will be observed from FIGURE 9, the milk passage and all of the flavor passages and the ice cream passage are all simultaneously connected to chamber 21. A displaceable stop member 133 is mounted for reciprocation in a longitudinally extending slot 134 in the handle shank 113. When stop member 133 is positioned relatively inwardly in slot 134 it will move into abutment with nut 88 so as to stop the movement of the valve member 19 before the milk entry passage 128 is brought into registration with passage 131. In this position of the valve member, the ice cream passages 26 and 17 are in registration and also all of the flavor passages are in registration by reason of circumferentially extending ports which may be seen in FIGURES 8 and 9 on the valve member 19 connected to passages 27, 28 and 29 and which bring these passages into registration with the flavor passages 51, 52 and 53 even though a direct radial alignment is not effected. A retaining ring 136 here surrounds stop member 133 and the handle shank 113 so as to retain the part 133 for sliding engagement in slot 134. For dispensing of ice cream cones, stop member 133 is positioned inwardly on handle shank 113. By moving handle 112 from its fully displaced counter clockwise position as illustrated in phantom line in FIGURE 9 the ice cream and flavor ports may be graduated open until a desired flow of ice cream and flavor material into the mixing chamber is effected. This will depend largely upon the discharge pressure of the ice cream from the freezer. It is also desirable to be able to regulate the pressure applied to the flavor materials so that a proper balance of flavor material and ice cream may be maintained. Movement of handle 112 to engage stop member 133 against nut 88 as indicated in phantom line in FIGURE 9 will bring the ice cream and flavor material passages to approximately their fully opened position, without opening the milk passage 128. Where a milkshake is to be dispensed, stop member 133 is slid outwardly to clear nut 88 thus permitting a full clockwise movement of handle 112 to the position shown in full lines in FIGURE 9. A pre-setting of handle 61 will provide for a basic vanilla milkshake or a milkshake of any of the flavors connected to the device.

The milkshake produced by the present device is substantially different than that produced by the continuous type milkshake freezer above discussed. The latter type of milkshake has a thick, heavy bodied, completely homogeneous, creamy consistency. The milkshake produced by the present device has a coarse rather than creamy consistency and is significantly lighter in texture and taste. What is thought to occur is that the entering milk fluid freezes in part on admixing with the very cold frozen confection and that ice crystals form which give the milkshake its coarse and light consistency. The presence of these ice crystals also makes the milkshake taste colder. Normally the entering milk is pre-refrigerated to about 40° F. or cooler so as to hold the milk under desired storage conditions. The coarse light textured effect is present, however, even without this pre-refrigeration of the milk and the fluid milk even though at substantially room temperature is immediately chilled on contact with the frozen confection and the milkshake as discharged will have a temperature in the range of about 25° F. to 30° F. A preferred milkshake composition is approximately 65 to 80 percent soft ice cream; 0 to 15 percent concentrated flavor material; and 20 to 35 percent fluid milk product.

Other watery fluid flavored materials may be run in through passage 131 for admixing with the soft ice cream. For example, a novel root beer freeze may be formed in this manner, in which case the root beer content to soft serve is preferably increased into the range of about 60 to 85 percent.

Figure 13:
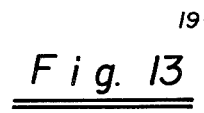
FIGURE 13 is a fragmentary cross-sectional view on a further enlarged scale of a portion of the device.

The design of the auger mixer 32 is important in the production of the above products particularly in providing a spinning of the milk into the more solid ice cream to produce the rough crystalline texture described. The design of the auger also is important in providing a thorough mixing of the ingredients without knocking the over-run of the basic material; in effecting a substantially complete evacuation of the material from the mixing chamber; in obtaining a smooth orderly discharge of the products without undue whirling and centrifugal throwing of the mixed product at the discharge end of the chamber; and the preventing of an undisturbed axial flow of a continuous shell of material in the chamber and to the discharge end. Former devices of the present character have used relatively very high beater speeds such as produced by series wound milkshake mixing machine motors, having a theoretical top speed in the order of 18,000 r.p.m., and a series of paddle barbs to produce mixing of the flavoring material and ice cream. Experience has shown that such a construction knocks the over-run in the basic material and also relies largely on the discharge pressure of the freezer to obtain proper flow of soft ice cream into the mixing chamber. In the present construction we reduce the rotating speed of the mixing device substantially to approximately 5,000 r.p.m. and provide for a mixer, a rotary auger composed of a central shaft 97 and a surrounding spiral involute vane 138 having a pitch for driving material in the chamber to the open discharge end 139 of the chamber, see FIGURE 13. It will also be observed that the vane 138 extends close to the inside wall 141 of chamber 21 to provide in cooperation therewith and the shaft a spiral chamber 142 functioning on rotation of the auger to displace a spiral stream of material to the discharge end 139. As a further feature of the construction the vane 138 is slotted as at 143 so as to pass a stratum of material in counter flow relation to the spirally flowing streams and thus to produce a mixing of the ice cream and flavor material in the chamber. Preferably, and as here shown, the vane is slotted so as to define axially spaced apart leading and trailing vane edges 146 and 147 defining a passageway therebetween for a stratum of material, and these edges are bevelled as seen in FIGURE 13 so as to effect a throwing back of each stratum so formed in the direction away from the discharge end 39. Preferably also and as here shown each vane convolution is formed with diametrically opposed slots as above described so as to provide a dynamically balanced structure. The extension of the vane 138 to very near the chamber wall 141 reduces the clearance therebetween to a dimension which effectively prevents the undisturbed axial flow of a continuous shell of material in the chamber to the discharge end. Without this control, the material discharged may have a main center body of a solid color, say chocolate, concealed within a surrounding thin shell of white vanilla.

Another feature of the auger and chamber construction is the regulation of a spacing $d$ between the lower end of the auger and the discharge end of the chamber, see FIGURE 13. If the auger is too long it will produce a swirling of the material as it is discharged from the lower end of the chamber making the discharge hard to handle and to shape by the operator. If the auger is too short, a plug of material will remain in the lower end of the chamber and must either be wasted, with a resulting loss to the operator, or mixed with the next serving which may be of a different flavor. In the design are presented, the distance $d$ is set so as to afford a steady non-whirling axial flow of the mixed product from the discharge end of the chamber without centrifugal throwing of the mixed product during motor driven rotation of the auger, and a substantially complete evacuation of the chamber as the motor and connected auger coast to a stop at the end of each serving. Also, the auger constructed and operated in the manner described will effect a most thorough mixing of the flavor material and soft ice cream without significantly affecting the over-run of the basic soft ice cream thus preserving the quality of the end product insofar as this important factor is concerned. Also the slotted spiral form of auger as disclosed provides a desired balance of mixing power and axial discharging thrust for affording an orderly easily handled and shaped discharge of thoroughly mixed product. Orderly, smooth discharge of the product is required in the production and serving of a cone where it is conventional to discharge the soft ice cream into an edible cup which is withdrawn downwardly when filled so as to shape the top of the cone.

Figure 15:
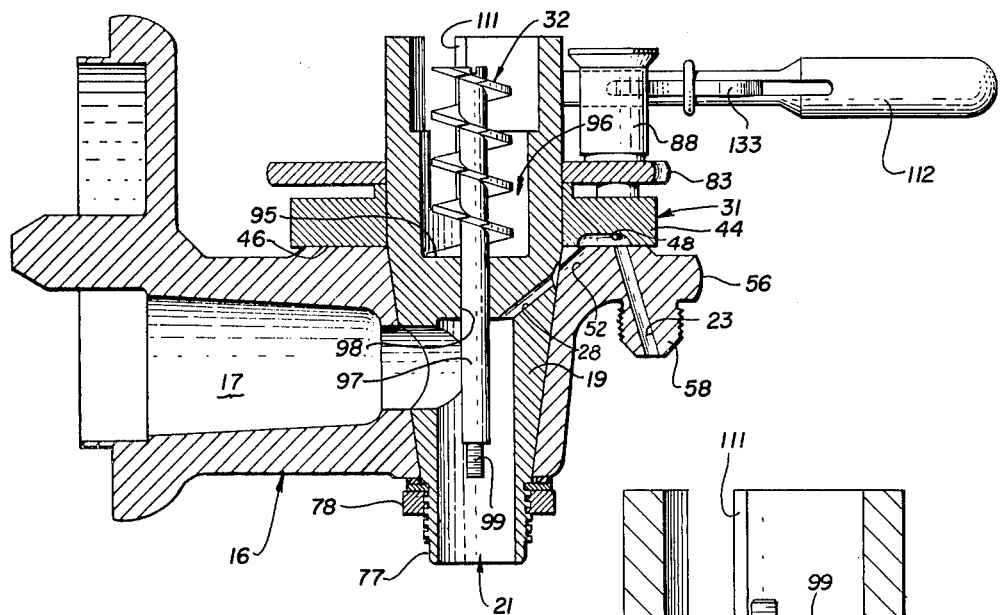
FIGURE 15 is a cross-sectional view of the device showing an optional positioning of certain of the parts.
Figure 14:
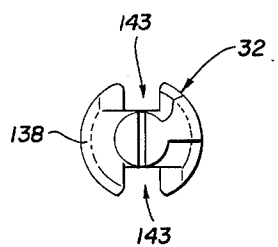
FIGURE 14 is an end elevation of the mixing auger used in the device.

As will be observed from the drawings, the device may be simply and conveniently dismantled at the end of a serving day for washing and cleaning of the parts. The auger may be easily removed by inserting key 102 into the lower end 139 of the chamber to engage spaced arms 151 and 152 of the key in the diametrically opposed slots 143 of the auger. Pin 103 may be manually advanced to hold the motor shaft against rotation and key 102 then manually turned to unthread the inner end 99 of the auger from the motor shaft bore 101. The motor housing may then be lifted off leaving the assembly as illustrated in FIGURE 15. Where there is ice cream remaining in the freezer, the operator will want to discharge the balance of the ice cream into containers for freezing or storage for subsequent sale or use. The balance of the material in the freezer may be conveniently evacuated by taking advantage of an optional reverse mounting of the auger 32 that is with the involute auger portion of the device positioned in the upper valve chamber 96 resting upon the top of the partition wall 95 and with the auger shaft 97 extending through and closing the axial bearing opening 98 in the top wall of the mixing chamber 21. In this position of the parts opening of the valve member 19 so as to admit soft ice cream into chamber 21, as illustrated in FIGURE 15, will permit the undisturbed flow and discharge of the soft ice cream remaining in the freezer. If desired, a streak of concentrated flavor material may be added by opening the flavor selecting valve 31 so as to enter simultaneously with the soft ice cream a stream of concentrated flavor material to produce what is known in the trade as a revel. Further dismantling of the valve may be readily accomplished by removing the nut 78 on the lower end 77 of the valve so as to permit a lifting out of the valve member 19. Removal of nuts 87 and 88 will then permit dismantling of the hold down plate 83 and valve plate 44.

While reference has been made herein to the use of the present valve with a basic soft ice cream, and the valve does present many advantages in such use as above noted, it will be understood that the valve may be used to flavor and modify basic frozen confections generally including soft ice cream, soft serve, ice milk, sherbet, and water ice products known in the trade as slush. Additionally, and as above explained, fluid milk or milk product as well as other carbonated and non-carbonated beverages may be run into the device through port 132 so as to produce a variety of beverage type confections such as milkshakes, ice cream sodas, freezes and the like.

We claim:

1. A flavor mixing and dispensing device for basic frozen confection comprising, a valve housing having an inner housing wall defining a valve chamber and an inlet passage opening to said wall and chamber and adapted for connection to the discharge of a continuous style frozen confection freezer, a valve members having a pheripheral wall mounted in sliding engagement with said housing wall and having an open ended product mixing and discharge chamber, said housing being formed with a plurality of passages each adapted for connection to an individual source of concentrated fluid flavor material under pressure and extending to said inner housing wall, said valve member having passages extending from said mixing chamber to said peripheral wall and arranged for simultaneous connection of said mixing chamber to said confection inlet passage and to all of said flavor material passages in said housing in one position of said valve member, valve means mounted for interrupting said flavor material passages adjacent said inner housing wall and arranged for selective one at a time opening thereof to permit flow of flavoring material to said mixing chamber, and a power driven device mounted in said mixing chamber for mixing the products therein.

2. A flavor mixing and dispensing device for a basic frozen confection comprising a valve housing having a valve chamber and an inlet passage adapted for connection to the discharge of a continuous style frozen confection freezer and opening to the wall of said chamber in a confection port, a rotary valve member having its periphery mounted for sealed rotation on said wall and having an axially extending bore open at one end for discharge of mixed product, said housing being formed with a plurality of spaced pairs of adjacent valve ports, one port of each pair being adapted for connection to a source of concentrated fluid flavor material under pressure, the other port of each pair being connected to a flavor port on said chamber wall, said valve member having passages arranged for simultaneous connection of said confection and flavor ports to said bore in one rotated position of said valve member, a second valve member form for selective one at a time connection of said pairs of ports, and a power driven device mounted in said bore for mixing the products therein and advancing the mixed products to said open bore end.

3. A flavor mixing and dispensing device for a basic frozen confection comprising, a valve housing having a valve chamber and an inlet passage adapted for connection to the discharge of a continuous style frozen confection freezer and opening to the wall of said chamber in a confection port, a rotary valve member having its periphery mounted for sealed rotation on said wall and having an axially extending bore open at one end for discharging of mixed product, said housing being formed with an annular concentric planar valve surface and with circumferentially spaced pair of adjacent ports, one port of each pair being adapted for connection to a source of concentrated fluid flavor material under pressure, the other port of each pair being connected to a flavor port on said chamber wall, said rotary valve member having passages arranged for simultaneous connection of said confection and flavor ports to said bore in one rotated position of said valve member, a second valve member slidably mounted on said surface and having passages arranged for selective one at a time connection of said pairs of ports, and a power driven device mounted in said bore for mixing the product therein and advancing the mixed products to said open bore end.

4. A frozen confection dispensing device comprising a freezer door face plate adapted for installation at the discharge end of a continuous style frozen confection freezer and a valve housing formed integrally therewith, said housing and plate providing a confection inlet passage, a valve member mounted in said housing and having an open-ended chamber for discharging mixed products, said plate and housing being formed of a heat conducting material and having sufficient area contact with the freezing chamber of said freezer and being of sufficient thickness to maintain said inlet passage at a reduced temperature and to substantially cool said chamber, said housing being formed with a plurality of passages each adapted for connection to a source of concentrated fluid flavor material under pressure, said valve member being formed to effect a simultaneous connection to said confection passage and all of said flavor passages to said chamber in one position of said valve member, valve means carried by said housing and intercepting said flavor passages and arranged for selective one at a time opening thereof, and a power driven device mounted in said chamber for mixing the products therein and for discharging the mixed products therefrom.

5. A frozen confection dispensing device comprising, a freezer door face plate adapted for installation at the discharge end of a continuous style frozen confection freezer and a valve housing formed integrally therewith and providing a conical valve chamber extending to an end face of said housing, said housing and plate providing a frozen confection inlet passage opening to the wall of said chamber, a rotary valve member having a tapered section mounted for rotation on said wall and having an axially extending open-ended bore for discharging mixed products, said plate and housing being formed of a heat conducting material and having sufficient area contact with the freezing chamber of said freezer and being of sufficient thickness to maintain said inlet passage at a reduced temperature and to substantially cool said chamber, said housing being formed with circumferentially spaced pairs of adjacent ports in said end face, one port of each pair being adapted for connection to a source of concentrated fluid flavor material under pressure, the other port of each pair being connected to said chamber wall, said valve member having passages arranged for simultaneous connection of said frozen confection and flavor passages to said bore in one rotated position of said valve member, an annular valve member journalled for rotation on said first named valve member and having a surface mounted in slidable engagement with said housing end face and having recesses contiguous to said surface forming passages therewith and arranged for selective one at a time connection to said pairs of ports, and a power driven device mounted in said bore for mixing the products therein and for discharging the mixed products therefrom.

6. A frozen confection dispensing device comprising, a freezer door face plate adapted for installation at the discharge end of a continuous style frozen confection freezer and a valve housing formed integrally therewith and providing a conical valve chamber having its larger end extending to an end face of said housing, said housing and plate providing a confection inlet passage opening to the wall of said chamber, a rotary valve member having a tapered section mounted for rotation on said wall and having an axially extending open-ended bore for discharging mixed products, said plate and housing being formed of a heat conducting material and having sufficient area contact with the freezing chamber of said freezer and being of sufficient thickness to maintain said inlet passage at a reduced temperature and to substantially cool said chamber said housing being formed with circumferentially spaced pairs of adjacent ports in said end face, one port of each pair being adapted for connection to a source of concentrated fluid flavor material under pressure, the other port of each pair being connected to said chamber wall, said valve member having passages arranged for simultaneous connection to said confection and flavor passages to said bore in one rotated position of said valve member, an annular valve member journalled for rotation on said first named valve member and having a surface mounted in slidable engagement with said housing end face and having recesses contiguous to said surface forming passages therewith and arranged for selective one at a time connection to said pairs of ports, and a power driven device mounted in said bore for mixing the products therein and for discharging the mixed products therefrom, an electric motor mounted on said first-named valve member for movement therewith and having a motor shaft connected to said device, and an electric starting switch for said motor mounted for actuation upon displacement of said motor.

7. An ice cream confection dispensing device comprising, a freezer door face plate adapted for installation at a discharge end of a continuous style soft ice cream freezer and a valve housing formed integrally therewith, a valve member carried by said housing and providing a mixing and product discharge chamber, said housing being formed with passages adapted for receipt of soft ice cream and a plurality of concentrated fluid flavor materials and fluid milk, a power driven mixing device in said chamber, valve means connected to certain of said passages and arranged for selection of one of a plurality of concentrated fluid flavor materials, said valve member being connected to certain of said passages and functioning in one position in conjunction with said valve means to simultaneously enter into said chamber soft ice cream and a pre-selected concentrated fluid flavor material and fluid milk, and in another position to simultaneously enter into said chamber soft ice cream and a pre-selected concentrated fluid flavor material while excluding fluid milk.

8. An ice cream confection dispensing device comprising, a freezer door face plate adapted for installation at a discharge end of a continuous style soft ice cream freezer and a valve housing integral therewith formed with an annular valve seat wall and an ice cream passage extending thereto; a valve member mounted for rotation on said wall and providing a mixing and product discharge chamber; a power driven mixing device in said chamber; said housing being formed with a plurality of passages extending to said wall, one being adapted for connection to a source of fluid milk and others being adapted for connection to different sources of fluid flavoring materials; valve means connected for selective opening of any one of said flavoring material passages; said valve member being formed to provide in one position for the connection of said ice cream passage and all of said flavoring material passages to said chamber while closing off said milk passage, and to provide in another position for the simultaneous connection of all of said passages to said chamber for the production of a selectively flavored ice cream milk shake.

9. An ice cream confection dispensing device comprising, a valve including a housing having inlet passages adapted for connection to a source of soft ice cream and a concentrated fluid flavor material and a manually operated valve member providing a product mixing and discharge chamber and formed and mounted for selective entry of soft ice cream to said chamber and simultaneous entry to said chamber of soft ice cream and flavor material, and a power driven rotary auger having a normal mounting in said chamber for mixing of products therein and including a shaft projecting through an opening provided therefor in said valve member, said auger having an optional reverse mounting with its shaft mounted in and closing said valve opening and with said auger removed from said chamber for selective discharge of soft ice cream and an ice cream revel therefrom.

10. A frozen confection dispensing device comprising, a metallic heat conducting mass formed to provide an integral freezer door plate adapted for installation at the discharge end of a continuous style frozen confection freezer and a valve housing, a metallic heat conducting valve member carried by said housing and providing a refrigerated mixing and product discharge chamber, said housing being formed with passages adapted for receipt of frozen confection from said freezer and for connection to a source of fluid milk, said valve member being formed to provide and having a position providing communication of said passages with said chamber for simultaneous entry therein of frozen confection and fluid milk, and a power driven mixing device in said chamber for mixing said confection and fluid milk and discharging the mixed product therefrom.

11. The method of making milk shakes from fluid milk and a frozen confection as delivered from a continuous style frozen confection freezer comprising, providing a mixing chamber immediately adjacent to and in thermal conductivity with a frozen confection freezer, effecting the simultaneous entry into said chamber of frozen confection from said freezer and fluid milk, effecting a rapid mixture of said milk and confection in said chamber, controlling the temperature of said mixture to form free ice crystals in said mixture, and discharging said mixture from said chamber.

12. The method of making milk shakes from fluid milk and a frozen confection as delivered from a continuous style frozen confection freezer comprising, effecting the simultaneous entry of a frozen confection directly from said freezer and without substantial increase in temperature and fluid milk into a mixing chamber, effecting a rapid mixture of milk and confection, controlling the temperature of said mixture to form free ice crystals in said mixture, and discharging said mixture.

13. A frozen confection dispensing device comprising, a body having inlet passages adapted for connection to a source of frozen confection and a fluid to be mixed therewith and being formed with an internal cylindrical wall having a vertical axis and an open bottom end providing a mixing and product discharge chamber and having said inlet passages extending into said chamber adjacent the upper end thereof for gravitation of said confection and fluid to said discharge end, and a power driven rotary auger mounted coaxially for rotation in said chamber and composed of a central shaft and a surrounding spiral involute vane extending to said chamber wall to provide in cooperation therewith and said shaft a spiral chamber functioning on rotation of said auger to displace a spiral stream of material downwardly to said open bottom discharge end of said chamber, said vane being slotted to define axially spaced apart leading and trailing vane edges and said edges being bevelled relative to the pitch of said vanes so as to effect an axial displacement of a stratum of material in counter flow relation to said spirally flowing stream to produce mixing of the frozen confection and fluid in said chamber.

14. An ice cream confection dispensing device as characterized in claim 13 wherein said vane is composed of a plurality of convolutions and each convolution is formed with diametrically opposed slots defining a dynamically balanced structure and each slot is formed with leading and trailing edges spaced and shaped as defined.

15. An ice cream confection dispensing device as characterized in claim 14, wherein the clearance between said vane and chamber wall is reduced to a dimension preventing the undisturbed axial flow of a continuous shell of material in said chamber and to said discharge end.

16. An ice cream confection dispensing device as characterized in claim 15 and including an electric motor having a drive shaft connected to one end of said auger shaft for driving said auger when the motor is energized and coasting to a stop when said motor is de-energized, the opposite end of said auger shaft being mounted adjacent to said chamber discharge end but spaced therefrom at substantially a predetermined minimum distance affording during rotation of said auger a steady non-whirling axial flow of mixed product from said discharge end without centrifugal throwing of mixed product and a substantially complete evacuation of said chamber as said auger coasts to a stop.

17. A frozen confection mixing and dispensing device comprising: a body having inlet passages adapted for connection to a source of frozen confection and a concentrated fluid flavor material and formed with an internal cylindrical wall having a vertical axis and an open bottom end providing a mixing and product discharge chamber and having said inlet passages extending into said chamber adjacent the upper end thereof for gravitation of said confection and material to said discharge end; a power driven rotary auger mounted coaxially for rotation in said chamber and composed of a central shaft and a surrounding spiral involute vane extending to close proximity with said chamber wall to provide in cooperation therewith a spiral chamber functioning on rotation of said auger to displace a spiral stream of material downwardly to said open bottom discharge end; said vane having slots formed therein between leading and trailing vane edges and said leading edges being bevelled so as to pass a stratum of material in counterflow relation to said spiral stream of material to produce mixing of the confection and flavor material in said chamber, and wherein the following conditions are satisfied:

(a) the clearance between said chamber wall and vane is sufficiently small to prevent the undisturbed axial flow of a continuous shell of material in said chamber and to said discharge end during rotation of said auger, and (b) the vane terminates within said chamber short of the discharge end thereof by a distance affording, during rotation of said auger, a steady non-whirling axial flow of mixed material from said discharge end, without centrifugal throwing of mixed product, and a substantially complete evacuation of said chamber when the flow of confection and concentrated fluid flavor through the inlet passages of the body is terminated.

18. A mixing device according to claim 17 wherein said vane is composed of a plurality of convolutions and said slots are formed at diametrically opposed positions in each of said convolutions to define a dynamically balanced structure.

References Cited by the Examiner
UNITED STATES PATENTS

| | | | |
|---|---|---|---|
| 2,262,293 | 11/1941 | Lilja et al. | 259—8 |
| 2,736,534 | 2/1956 | Atkins | 259—8 |
| 2,867,418 | 1/1959 | Merrels | 259—8 |
| 3,076,637 | 2/1963 | Moziek et al. | 259—8 |

WALTER A. SCHEEL, *Primary Examiner.*

J. SHANK, *Examiner.*